United States Patent
Shepherd et al.

(10) Patent No.: US 7,281,058 B1
(45) Date of Patent: Oct. 9, 2007

(54) DELIVERING AND RECEIVING MULTICAST CONTENT ACROSS A UNICAST NETWORK

(75) Inventors: Gregory J Shepherd, Eugene, OR (US); Thomas J Pusateri, Wake Forest, NC (US)

(73) Assignee: Juniper Networks, Inc., Sunnyvale, CA (US)

( * ) Notice: Subject to any disclaimer, the term of this patent is extended or adjusted under 35 U.S.C. 154(b) by 931 days.

(21) Appl. No.: 10/268,413

(22) Filed: Oct. 9, 2002

(51) Int. Cl.
*G06F 15/173* (2006.01)
(52) U.S. Cl. .................. 709/238; 709/227; 709/230
(58) Field of Classification Search ............ 709/238, 709/249, 217, 227
See application file for complete search history.

(56) References Cited

U.S. PATENT DOCUMENTS

| | | | |
|---|---|---|---|
| 6,259,701 B1 | 7/2001 | Shur et al. | |
| 6,397,255 B1* | 5/2002 | Nurenberg et al. | 709/228 |
| 6,798,773 B2* | 9/2004 | Trossen et al. | 370/390 |
| 6,873,627 B1* | 3/2005 | Miller et al. | 370/466 |
| 7,031,326 B1* | 4/2006 | Shur et al. | 370/401 |
| 7,039,052 B2* | 5/2006 | Fox et al. | 370/390 |
| 2001/0018714 A1 | 8/2001 | Yagyu et al. | |
| 2001/0026556 A1 | 10/2001 | Yagyu et al. | |
| 2002/0001310 A1 | 1/2002 | Mai et al. | |
| 2002/0143951 A1* | 10/2002 | Khan et al. | 709/227 |
| 2003/0195964 A1* | 10/2003 | Mane | 709/227 |

OTHER PUBLICATIONS

Network Working Group RFC 3306, "Unicast-Prefix-based IPv6 Multicast Addresses", Aug. 2002.*
Network Working Group RFC 2991, "Multipath Issues in Unicast and Multicast Next-Hop Selection", Nov. 2000.*

* cited by examiner

*Primary Examiner*—William Vaughn
*Assistant Examiner*—Joseph Maniwang
(74) *Attorney, Agent, or Firm*—Shumaker & Sieffert, P.A.

(57) ABSTRACT

Techniques for delivering and receiving multicast content across a unicast network are described. A system that supports delivery and reception of multicast content across a unicast network includes a first device and a second device. The first device may be a destination device or a multicast-enabled router. The second device is multicast-enabled, and may be a multicast-enabled router. The first device determines whether a route between a destination device and a source of multicast packets is multicast-enabled, sends a unicast request message that includes as a destination address an address associated with the source and is marked for interception by a second device based on the determination, and receives the multicast packets as unicast packets from the second device. The second device intercepts the unicast request message and delivers the multicast packets to the requesting device as unicast packets in response to the unicast request message. The unicast request message indicates the address of the source and a group address, i.e., a source/group address pair, associated with the multicast packets that the first device wishes to receive.

61 Claims, 7 Drawing Sheets

DELIVERING AND RECEIVING MULTICAST CONTENT ACROSS A UNICAST NETWORK

TECHNICAL FIELD

The invention relates to computer networks and, more particularly, to multicast communications within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices within a network, referred to as routers, maintain routing information that describes available routes through the network. Each route defines a path between two locations on the network. Upon receiving an incoming data packet, the router examines header information within the packet to identify the destination for the packet. Based on the header information, the router accesses the routing information, selects an appropriate route for the packet and forwards the packet accordingly.

Multicasting is a form of communication that allows a source device to send a single packet for distribution to multiple destination devices. With multicasting, the source device sends a single packet over the network to a router configured for multicasting. The router replicates the packet and forwards the copies to other multicast-enabled routers. The other routers, in turn, replicate the packet and repeat the forwarding process so that each of the destination devices receives a copy of the packet.

In some cases, there is not a multicast-enabled route from a source device to a particular destination device, i.e., a route where every router thereon is multicast-enabled. In these cases, the particular destination device is unable to receive multicast packets using existing multicasting protocols. To gain maximum audience size, multicast content providers generate copies of the multicast packets addressed to each such destination device, i.e., unicast packet copies of the multicast packets, at the source of the multicast packets, and deliver the unicast packets to these destination devices from the source of the multicast packets.

Content providers may incur increased costs stemming from the generation and delivery of the unicast packets. These costs may include the increased processing and memory resources required to generate and uniquely address unicast packets for each such destination device. The content providers may have to use multiple servers to provide the multiple unicast packet copies of the multicast packets. Further, delivery of the multiple unicast packets may lead to greater bandwidth consumption within the local network for the content provider, and require that the content provider obtain a greater bandwidth connection to the Internet than would otherwise be required to deliver the single set of multicast packets, the cost of which will likely be passed to the content provider by an Internet Service Provider (ISP), or the like.

SUMMARY

In general, the invention is directed to delivery and reception of multicast content across unicast networks. A destination device is a host within a computer network that wishes to receive content that is delivered by a source device as multicast packets. The destination device sends a multicast join message to a local router in order to join a multicasting group associated with the desired content and receive the multicast packets. If the attempt to join the multicast group fails, i.e., the destination device determines that the route to the source device is not multicast-enabled because it does not receive the requested multicast packets before a time-out condition is satisfied, the destination device may send a unicast request message that includes as a destination address an address associated with the source and is marked for interception by an intermediate network device, such as a multicast-enabled router, based on the determination. A multicast-enabled router on the route to the source device that receives a multicast join message may also determine that the route to the source device is not multicast-enabled by determining that a next-hop router on the route to the source device is not multicast-enabled, and send a unicast request message addressed to the source and marked for interception by an intermediate network device, such as another multicast-enabled router, based on the determination, so that it may deliver the multicast packets to the requesting destination device.

Although the unicast request message is addressed to the source device, the one or more packets of the unicast request message may contain information that will cause a intermediate network device that is on the route to the source device to intercept and process the packets of the unicast request message, such as a set router alert bit, and identify the unicast request message as containing a request to receive multicast packets as unicast packets, such as a port indication. The unicast request message may be addressed to the source, or to an anycast address. The information of the unicast request message includes the group address associated with the multicast content, the address of the source device, and the address of requesting device, i.e., the destination device or multicast-enabled router that sent the unicast request message. The information may also include delivery mode indication and a time-out value.

The multicast-enabled router that receives the unicast request message receives multicast packets with the source/group address pair indicated by the unicast request message, and delivers the multicast packets to the requesting device as unicast packets based on the unicast request message. The multicast-enabled router that receives the unicast request message may refer to a delivery mode indication received in the unicast request message, and deliver the multicast packets to the requesting device as unicast packets according to the delivery mode indicated. The multicast-enabled router that receives the unicast request message may readdress the multicast packets to include the address of the requesting device as the destination address of the packets, and deliver the readdressed packets accordingly. The multicast-enabled router that receives the unicast request message may add a header that includes the address of the requesting device as a destination address, and deliver the encapsulated packets accordingly. The multicast-enabled router that receives the unicast request message may add a label to the multicast packets, and send the labeled packets to the requesting device via an LSP. The label and LSP may be selected based on the address of the requesting device.

A multicast-enabled router that sends a unicast request message and receives encapsulated or labeled packets in response to the unicast request message may remove the encapsulation or labels to expose multicast packets, and forward the multicast packets according to the multicast join message that it received for the source/group address pair of the multicast packets so that the multicast packets may be received by the destination device.

In one embodiment, a method comprises intercepting a unicast request message from a requesting device that includes as a destination address an address associated with a source of multicast packets, and delivering the multicast packets to the requesting device as unicast packets in response to the unicast request message.

In another embodiment, a network device includes an interface and a control unit. The interface to intercepts a unicast request message from a requesting device that includes as a destination address an address associated with a source of multicast packets. The control unit delivers the multicast packets to the requesting device as unicast packets in response to the unicast request message.

In another embodiment, a computer-readable medium contains instructions. The instructions cause a programmable processor intercept a unicast request message from a requesting device that includes as a destination address an address associated with a source of multicast packets, and deliver the multicast packets to the requesting device as unicast packets in response to the unicast request message.

In another embodiment, a method comprises determining whether a route to a source of multicast packets is multicast-enabled, sending a unicast request message that includes as a destination address an address associated with the source and is marked for interception by an intermediate network device based on the determination, and receiving multicast packets as unicast packets from the intermediate network device.

In another embodiment, the invention is directed to a device comprising a control unit. The control unit determines whether a route to a source of multicast packets is multicast-enabled, sends a unicast request message that includes as a destination address an address associated with the source and is marked for interception by an intermediate network device based on the determination, and receives the multicast packets as unicast packets from the intermediate network device.

In another embodiment, the invention is directed to a computer-readable medium containing instructions. The instructions cause a programmable processor to determine whether a route to a source of multicast packets is multicast-enabled, send a unicast request message that includes as a destination address an address associated with the source and is marked for interception by an intermediate network device based on the determination, and receive the multicast packets as unicast packets from the intermediate network device.

In another embodiment, the invention is directed to a system that includes a first device and a second device. The first device determines whether a route to a source of multicast packets is multicast-enabled, sends a unicast request message that includes as a destination address an address associated with the source and is marked for interception by a second device based on the determination, and receives the multicast packets as unicast packets from the second device. The second device intercepts the unicast request message from the first device, and delivers the multicast packets to the first device as unicast packets in response to the unicast request message.

The invention may provide one or more advantages. For example, the ability of multicast-enabled routers consistent with the principles of the invention to deliver and receive multicast content across unicast networks advantageously reduces the costs that are born by the content provider in delivering content to destination devices that are unable to receive multicast packets using existing multicasting protocols. Multicast-enabled routers consistent with the principles of the invention allow these destination devices to receive the multicast content from the source device without the generation and delivery of unicast copies of the multicast packets by the content provider, i.e., the source device may generate and deliver a single set of multicast packets. Moreover, to the extent that numerous destination devices that are unable to receive the multicast packets request the content, the burden of delivering unicast packets to these destination devices may be distributed over a number of multicast-enabled routers.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
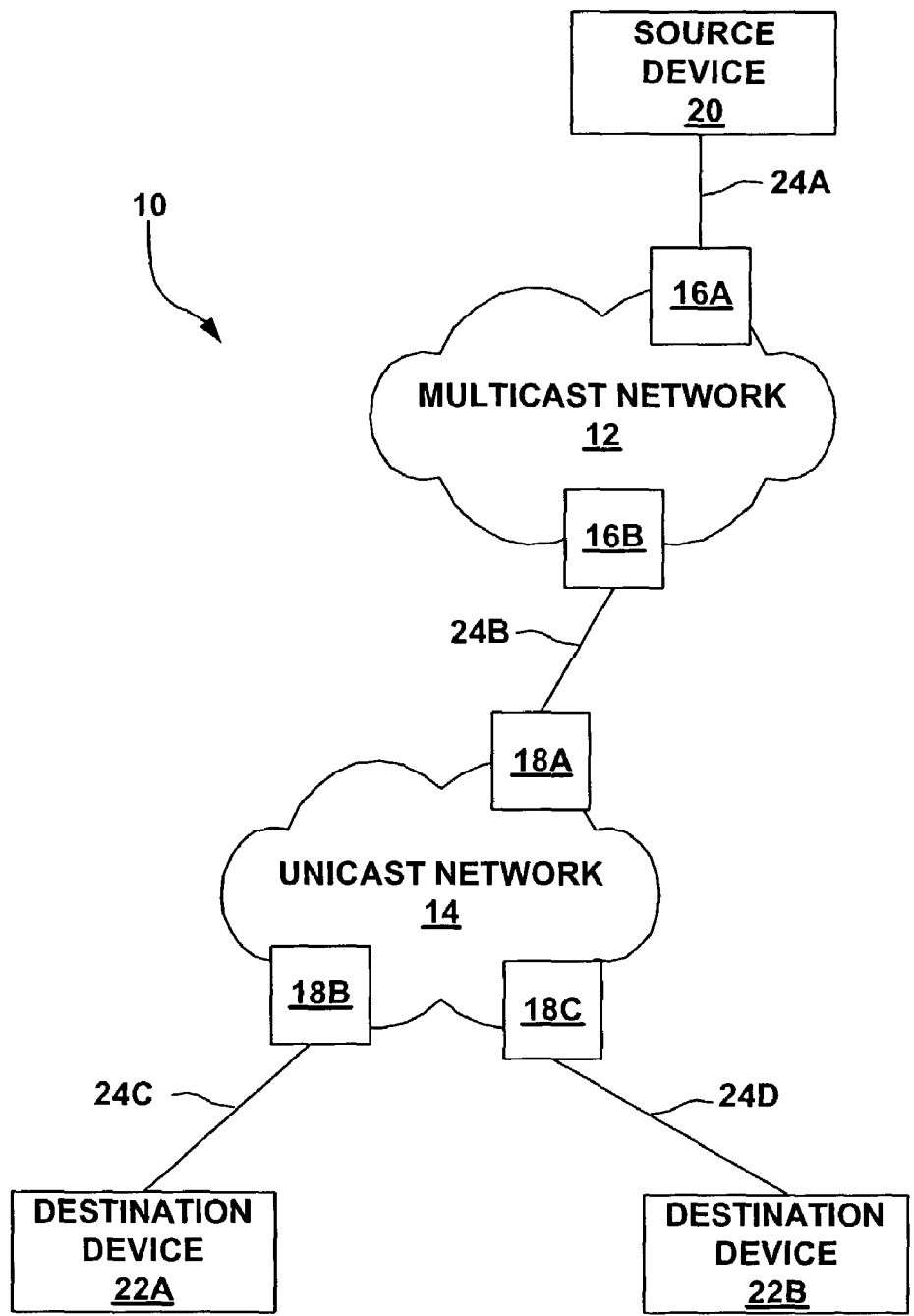
FIG. 1 is a block diagram illustrating an example computer network that supports delivery and reception of multicast content across a unicast network consistent with the principles of the invention.

FIG. 1 is a block diagram illustrating an example computer network 10 that supports delivery and reception of multicast content across a unicast network 14 consistent with the principles of the invention. As shown in FIG. 1, computer network 10 includes a multicast network 12 and unicast network 14. Multicast network 12 includes multicast-enabled routers 16A and 16B (multicast-enabled routers 16). Unicast network 14 includes unicast routers 18A, 18B and 18C (unicast routers 18). Multicast network 12 may include any number of multicast-enabled routers 16, and unicast network 14 may include any number of unicast routers 18. However, for ease of illustration, only multicast-enabled routers 16A and 16B and unicast routers 18A-18C are shown in FIG. 1.

A source device 20 accesses multicast network 12 via link 24A and multicast-enabled router 16A. At the boundary between multicast network 12 and unicast network 14, multicast-enabled router 16B and unicast router 18A are connected via link 24B. Destination device 22A and destination device 22B (destination devices 22) access unicast network 14 via link 24C and unicast router 18B, and link 24D and unicast router 18C, respectively. Links 24 may be, for example, PPP links, ATM links, Ethernet links, Frame Relay links, GRE tunnels, SONET links, or other network connections.

Source device 20 is a source of content, such as video, audio, data, or other information, delivered as multicast packets. Source device 20 may be, for example, a server, or the like, configured to generate multicast packets and deliver the multicast packets to multicast-enabled router 16A. Source device 20 may deliver a series of multicast packets as a multicast packet stream. Although computer network 10 may include any number of source devices 20, FIG. 1, for ease of illustration, shows only the single source device 20.

Destination devices 22 are hosts within computer network 10 that wish to receive the content that is delivered by source device 20 as multicast packets. Destination devices 22 may be computing devices such as personal computers, laptop computers, and the like. Destination devices 22 include a processor or other control unit (not shown) and a network interface (not shown) by which the processor accesses resources within computer network 10. Destination devices 22 may also include a user interface that allows a user of the destination device to interact with the processor and with resources within computer network 10. Destination devices 22 may execute program instructions stored on any of a variety of computer-readable media, such as magnetic or optical media, RAM, ROM, EEPROM, flash memory, or the like, or received via computer network 10. Although computer network 10 may include any number of destination devices 22 accessing either multicast network 12 or unicast network 14, FIG. 1, for ease of illustration shows only destination devices 22A and 22B accessing unicast network 14.

Multicast-enabled routers 16 of multicast network 12 support multicasting protocols, such as Internet Group Management Protocol (IGMP) and Protocol Independent Multicast (PIM), that allow a single multicast packet generated by source device 20 to be delivered to multiple destination devices 22 through replication and forwarding of the multicast packet along a distribution tree between the source device 20 and destination devices 22. In order for a destination device 22 to receive multicast packets in this manner, a multicast-enabled route, consisting entirely of multicast-enabled routers 16, must connect the destination device 22 to the source device 20. Because the routes from destination devices 22 to source device 20 include unicast routers 18 of unicast network 14, which do not support these protocols, destination devices 22 cannot receive multicast packets in this manner.

Additionally, however, multicast-enabled router 16B supports delivery of multicast content across unicast network 14. Specifically, as will be described in greater detail below, multicast-enabled router 16B intercepts unicast request messages that are sent by requesting devices, such as destination devices 22, and include as a destination addresses an address associated with source device 20. In particular, the unicast request messages request delivery of multicast packets from source device 20 as unicast packets. Multicast-enabled router 16B delivers multicast packets received from source device 20 to destination devices 22 as unicast packets in response to the unicast request messages received from destination devices 22.

The ability of multicast-enabled router 16B to deliver multicast content across unicast networks in this manner may advantageously reduce the costs that are born by the content provider in delivering content to destination devices 22 that are unable to receive multicast packets using existing multicasting protocols. Specifically, destination devices 22 may receive the multicast content from source device 20 without the generation and delivery of unicast copies of the multicast packets at source device 20. Moreover, the burden of delivering unicast packets to multiple destination devices 22 may be distributed over a number of multicast-enabled routers 16.

If a user of destination device 22A of FIG. 1 wishes to receive multicast content from source device 20, destination device 22A will attempt to join the multicasting group associated with the multicast content by sending a multicast join message, i.e., requesting the multicast content provided by source device 20 for that group. The multicast join message sent by a destination device 22A may take the form of an IGMP control packet, e.g., a Host Membership Report.

Destination device 22A will send a multicast join message to the local router to which it is connected, unicast router 18B. Because unicast router 18B is not multicast-enabled, i.e., does not support multicast protocols such as IGMP, unicast router 18B will discard the multicast join message sent by destination device 22A. Therefore, destination device 22A will not be able to join the multicasting group, and will not receive the requested multicast content. Destination device 22A will attempt to receive the multicast content via another delivery mechanism.

To that end, destination device 22A will send a unicast request message that includes as a destination address an address associated with source device 20, and is marked for interception by a multicast-enabled router 16, such as multicast-enabled router 16B, on the route between destination device 22A and source device 20. Destination device 22A receives the information necessary to send the unicast request message in a session description file sent to destination device 22A by source device 20, or another device within computer network 10. The unicast request message may be addressed to source device 20 so that unicast routers 18 will route the unicast request message along the route to source device 20. The one or more packets of the unicast request message contain information that will cause multicast-enabled router 16B, which is on the route to source device 20, to intercept and process the unicast request message.

For example, a router alert bit may be set in the one or more packets of the unicast request message to cause each router 16,18 on the route from destination device 22A to source device 20 to intercept and inspect the packets. The packets may also include a port indication, which indicates that the sending device is requesting a service, in this case delivery of multicast packets as unicast packets. Unicast routers 18B and 18A, which do not provide this service, will inspect the packets to find the port indication, determine that the service is not provided, and forward the packets on the route to source device 20. Multicast-enabled router 16B will inspect the packets to find the port indication, determine that the service is provided, and deliver the multicast packets to destination device 22A as unicast packets.

Destination device 22A may also send a unicast request message that includes as a destination address an address associated with source device 20 and marked for interception by a multicast-enabled router 16, such as multicast-enabled router 16B, by sending a unicast request message that is addressed to an anycast address that is associated with source device 20. The anycast address is associated with source device 20 in that the session description file indicates to destination device 22A that multicast packets from source device 20 may be received as unicast packets by sending a unicast request message to the anycast address. The anycast address may be associated with multiple source devices 20 in this manner.

An anycast address is a nonunique unicast address that may be shared by multiple multicast-enabled routers 16. Unicast routers 18 that receive the unicast request message addressed to the anycast address from destination device 22A will forward the unicast request message to the nearest multicast-enabled router 16. The nearest multicast-enabled router 16, in this case multicast-enabled router 16B, will process the unicast request message and deliver the multicast packets to destination device 22A as unicast packets. In some cases, the anycast address may be shared by source device 20, as well as multicast-enabled routers 16

The unicast request message contains information that may be used by multicast-enabled router 16B to receive the multicast packets containing the multicast content, and deliver the multicast packets to destination device 22A as unicast packets. The information includes the group address associated with the multicast content, the address of source device 20, which is the destination address of the one or more packets of the unicast request message, and the address of destination device 22A, which is the source address of the one or more packets of the unicast request message.

The information may also include a delivery mode indication. The delivery mode indication indicates to multicast-enabled router 16B the manner in which multicast packets should be delivered to destination device 22A as unicast packets. The delivery mode indication of the unicast request message sent by destination device 22A may indicate readdressed delivery, i.e., that multicast packets containing the requested multicast content should be readdressed to include the address of destination device 22A as the destination address. The delivery mode indication may alternatively indicate encapsulated delivery, i.e., that multicast packets containing the requested multicast content should be encapsulated with a header that includes the address of destination device 22A. Encapsulated delivery may be according to Generic Route Encapsulation (GRE), and may, for example, advantageously allow destination device 22A to receive the multicast content through a firewall. Further, the information may include a time-out value, which may be used by multicast-enabled router 16B to control the duration for which the multicast-enabled router 16B will deliver multicast packets to destination device 22A as unicast packets.

When multicast-enabled router 16B intercepts the unicast request message sent by destination device 22A, if multicast-enabled router 16B is not already receiving packets for the requested multicast, multicast-enabled router 16B will send a multicast join message to multicast-enabled router 16A based on the receipt of the unicast request message sent by destination device 22A. The multicast join message sent by a multicast-enabled router 16B may take the form of a PIM Join.

Multicast-enabled router 16B will maintain multicast forwarding information for the source/group address pair indicated by the unicast request message intercepted from destination device 22A that includes information from the unicast request message. Multicast-enabled router 16B will store the address of destination device 22A as multicast forwarding information for the source/group address pair indicated in by the unicast request message. Multicast-enabled router 16B may also store a delivery mode indication and a time-out value from the unicast request message as multicast forwarding information for the source/group address pair indicated in by the unicast request message. Multicast-enabled router 16B may maintain multicast forwarding information as lists or tables for each source/group address pair.

Multicast-enabled router 16B uses the multicast forwarding information to deliver received multicast packets to destination device 22A. When multicast-enabled router 16B receives multicast packets with the source/group address pair indicated in the intercepted unicast request message, multicast-enabled router 16B may deliver the multicast packets to destination device 22A as unicast packets according to the delivery mode indicated by the multicast forwarding information for the source/group address pair. Multicast-enabled router 16B may readdress the packets to include the address of destination device 22A stored within multicast forwarding information maintained by multicast-enabled router 16B for the source/group address pair, or encapsulate the packets with a header that includes the address of destination device 22A. Multicast-enabled router 16B will than deliver the packets to destination device 22A on a route to destination device 22A within unicast routing information maintained by multicast-enabled router 16B, i.e., via unicast routers 18A and 18B.

Multicast-enabled router 16B may readdress the multicast packets for destination device 22A by replicating the multicast packets to include the address of destination device 22A as the destination address for the packets. If multicast-enabled router 16B receives a unicast request message from destination device 22B that indicates the same source/group address pair as the multicast packets that it is already receiving to deliver to destination device 22A, multicast-enabled router 16B may replicate another copy of the multicast packets to include the destination address of destination device 22B, than deliver these packets to destination device 22B on a route to destination device 22B within the unicast routing information maintained by multicast-enabled router 16B, i.e., via unicast routers 18A and 18C. Multicast-enabled router 16B will store the address of destination device 22B, and may store a delivery mode indication and a time-out value within the multicast forwarding information maintained by multicast-enabled router 16B for that source/group address pair, as described above.

As mentioned above, the unicast request messages sent by destination devices 22 may include a time-out value that is used to control the duration of the delivery of multicast packets as unicast packets to destination devices 22. Multicast-enabled router 16B may continue to deliver unicast packets to destination devices 22, so long as the information within the unicast request messages sent by destination devices 22 remains within the multicast forwarding information maintained by multicast-enabled router 16B. Multicast-enabled router 16B may run a timer using the time-out value provided in the unicast request messages, each time a unicast request message is received. In order to keep the unicast request message information within the multicast forwarding information, destination device 22 may need to periodically resend the unicast request message before the time-out value expires.

When a destination device 22 no longer wishes to receive the content provided by source device 20 for a particular group, it may stop sending unicast request messages that indicate that source/group address pair. In some embodiments of the invention, when a destination device 22 no longer wishes to receive the content provided by source device 20, it may send a message addressed to the source, that will be received by multicast-enabled router 16B similar to the unicast request message, indicating that it no longer wishes to receive the content provided by source device 20 for the group. In either case, multicast-enabled router 16B will remove the information from the unicast request message from within the multicast forwarding information maintained by multicast-enabled router 16B for that source/group address pair, and thus stop delivery of unicast packets to that destination device 22.

Figure 2:
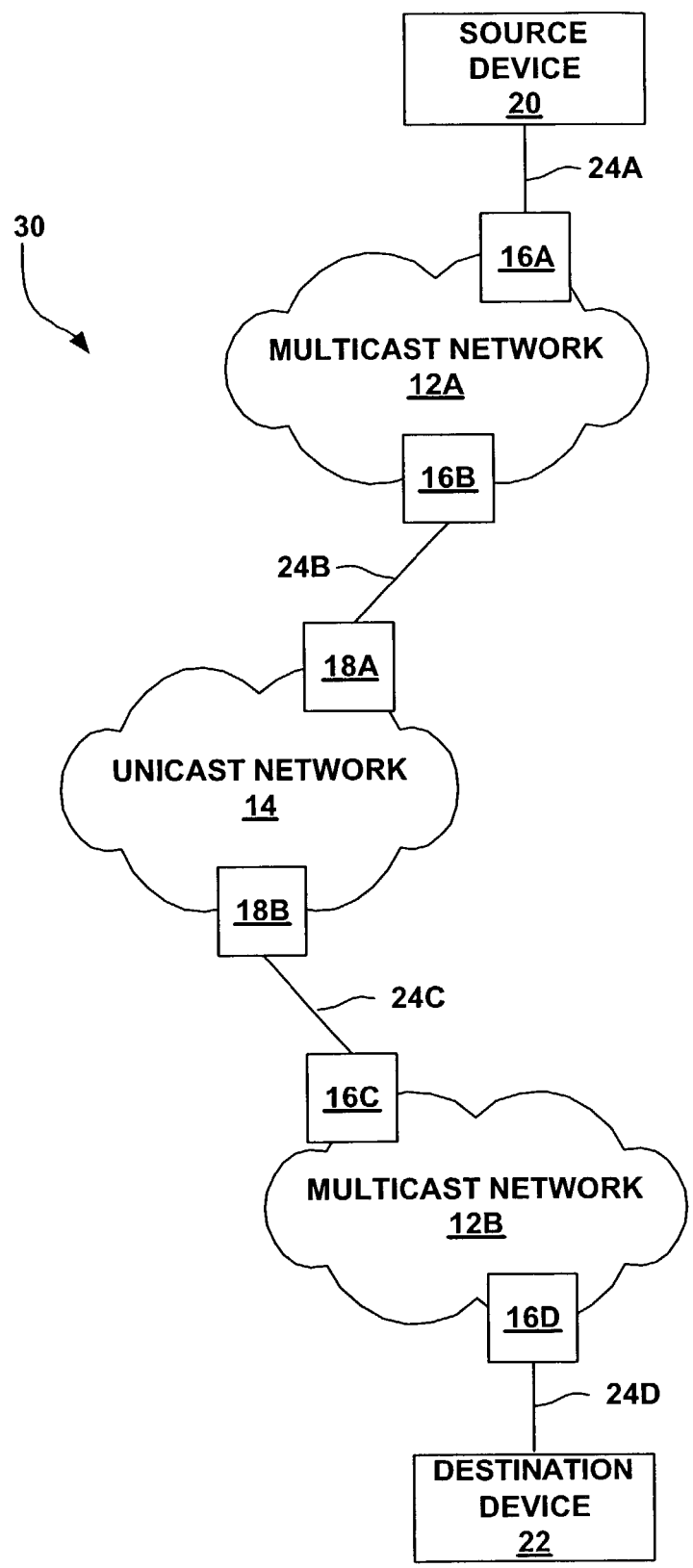
FIG. 2 is a block diagram illustrating another example computer network that supports delivery and reception of multicast content across a unicast network.

FIG. 2 is a block diagram illustrating another example computer network 30 that supports delivery and reception of multicast content across a unicast network 14. As shown in FIG. 2, computer network 30 includes multicast network 12A and 12B and unicast network 14. Multicast networks 12A and 12B (multicast networks 12) include multicast-enabled routers 16A and 16B, and multicast-enabled routers 16C and 16D (multicast-enabled routers 16) respectively. Unicast network 14 includes unicast routers 18A and 18B (unicast routers 18). Multicast networks 12 may include any number of multicast-enabled routers 16, and unicast network 14 may include any number of unicast routers 18. However, for ease of illustration, only multicast-enabled routers 16A, 16B, 16C, and 16D, and unicast routers 18A and 18B are shown in FIG. 2.

A source device 20, accesses multicast network 12A via a link 24A and multicast-enabled router 16A. At the boundary between multicast network 12A and unicast network 14, multicast-enabled router 16B and unicast router 18A are connected via a link 24B. At the boundary between unicast network 14 and multicast network 12B, unicast router 18B and multicast-enabled router 16C are connected by a link 24C. A destination device 22 accesses multicast network 12B via a link 24D and multicast-enabled router 16D.

Source device 20 is, as described above with reference to FIG. 1, a source of content delivered as multicast packets. Destination device 22 is, as described above with reference to FIG. 1, a host within computer network 30 that wishes to receive the content that is delivered by source device 20 as multicast packets. As described above with reference to FIG. 1, links 24 may be, for example, PPP links, ATM links, Ethernet links, Frame Relay link, GRE tunnels, SONET links, or other network connections.

As described above with reference to FIG. 1, multicast-enabled routers 16 support multicasting protocols, such as IGMP and PIM, that allow a single multicast packet generated by a source device to be delivered to multiple destination devices through replication and forwarding of the multicast packet along a distribution tree between the source device and destination devices. Further, as described above with reference to FIG. 1, multicast-enabled router 16B supports delivery of multicast content across unicast network 14 in that multicast-enabled router 16B is able to intercept unicast request messages that are sent by requesting devices and include as a destination address an address associated with source device 20, and deliver the multicast packets to the requesting devices as unicast packets in response to the unicast request messages. Additionally, multicast-enabled router 16C supports reception of multicast content across unicast network in that multicast-enabled router 16C is able to determine whether the route to source device 20 is multicast-enabled, send a unicast request message that includes as a destination address an address associated with source device 20 and is marked for interception by an intermediate network device, and receive multicast packets as unicast packets from the intermediate network device across unicast network 14 so that it the multicast packets may be delivered to a destination device 22. The ability of multicast-enabled routers 16B and 16C to deliver and receive multicast content across unicast network 14 advantageously reduces the costs that are born by the content provider in delivering content to destination device 22 that is unable to receive multicast packets, as described above If a user of destination device 22 of wishes to receive multicast content from source device 20, destination device 22 may send a multicast join message, which may be an IGMP group membership report, to multicast-enabled router 16D indicating a source/group address pair that includes an address for source device 20. Multicast-enabled router 16D will in turn send a multicast join message, such as a PIM Join, indicating the source/group address pair to multicast-enabled router 16C. When a multicast-enabled router 16C receives the multicast join message from multicast-enabled router 16D, multicast-enabled router 16C will determine whether the route to source device 20 is multicast-enabled.

Multicast-enabled router 16C makes this determination by determining whether a next-hop router, i.e., unicast router 18B, on the route to the source device 20 is multicast-enabled. Multicast-enabled router 16C makes this determination by determining whether the unicast router 18B is a peer or neighbor for a multicasting protocol, such as PIM. In some embodiments, multicast-enabled router 16D may make this determination by determining whether multicast routing information maintained by multicast-enabled router 16D contains a route to source device 20, i.e., indicates a next-hop multicast-enabled router 16 to source device 20. Multicast router 16C may generate multicast routing information from unicast routing information maintained by multicast router 16C, or by exchanging multicast routing information with other multicast-enabled routers 16 via a multicast routing protocol such as multicast border gateway protocol (MBGP).

Multicast-enabled router 16C will determine that unicast router 18B is not a peer for multicasting protocols, and the multicast routing information maintained by multicast-enabled router 16C does not contain a route to source device 20. Rather than discard the multicast join message received from multicast-enabled router 16D because there is no multicast-enabled route to source device 20, in which case destination device 22 may not receive the requested multicast packets, multicast-enabled router 16C will send a unicast request message that includes as a destination address an address associated with source device 20 and is marked for interception by an intermediate network device, such as another multicast-enabled router 16.

The unicast request message sent by multicast-enabled router 16C contains the group address indicated in the multicast join message received from multicast-enabled router 16D, the address of source device 20, which may be the destination address of the one or more packets of the unicast request message, and the address of the requesting device, i.e., the address of multicast-enabled router 16C. The unicast request message may also contain a delivery mode indication. The delivery mode indicated may be encapsulated delivery, such as delivery via generic route encapsulation (GRE). The unicast request message may also contain a time-out value as described above.

Further, as described above, the one or more packets of the unicast request message sent by multicast-enabled router 16C may contain information that will cause a multicast-enabled router 16, which is on the route to the source device 20, to intercept and process the packets of the unicast request message, such as a set router alert bit, and identify the unicast request message as containing a request to receive multicast packets as unicast packets, such as a port indication. The unicast request message sent by multicast-enabled router 16C may follow the route to source device 20 via unicast routers 18B and 18A, and be intercepted, processed, and identified as containing a request to receive multicast packets as unicast packets by multicast-enabled router 16B. Multicast-enabled router 16C may also send a unicast request message that includes as a destination address an address associated with source device 20 and is marked for interception by a multicast-enabled router 16, such as multicast-enabled router 16B, by sending a unicast request message that is addressed to an anycast address, as described above.

When multicast-enabled router 16B intercepts the unicast request message sent by multicast-enabled router 16C, multicast-enabled router 16B may store information from the message as multicast forwarding information for the source/group address pair indicated by the unicast request message, and determine whether multicast-enabled router 16B is already receiving multicast packets for the source/group address pair, as described above. The information stored by multicast-enabled router 16B includes the address of multicast-enabled router 16C, and may include a delivery mode indication, and a time-out value. If multicast-enabled router 16B is not already receiving multicast packets, multicast-enabled router 16B may send a multicast join message, such as a PIM Join, to source device 20, as described above.

When multicast-enabled router 16B receives multicast packets for the source/group address pair, multicast-enabled router 16B will encapsulate those packets with a header that includes the address of multicast-enabled router 16C, and deliver the encapsulated packets to multicast-enabled router 16C. Multicast-enabled router 16B may recognize that the packets are to be encapsulated based on the delivery mode indication. Multicast-enabled router 16C, as was the case with destination devices 22 of FIG. 1, may need to periodically resend the unicast request message, i.e., before the time-out period indicated by the unicast request message expires, in order to continue to receive the encapsulated packets from multicast-enabled router 16B.

When multicast-enabled router 16C receives the encapsulated packets, multicast-enabled router 16C will remove the encapsulation for the multicast packets and forward the packets according to the multicast forwarding information maintained by multicast-enabled router 16C, i.e., identify the source/group address pair of the multicast packets, and forward the multicast packets over the interface by which the multicast join message from multicast-enabled router 16D was received. When multicast-enabled router 16D receives the multicast packets from multicast-enabled router 16C, multicast-enabled router 16D will similarly forward the packet on the interface by which the multicast join message from destination device 22 was received. If one of the multicast-enabled routers 16 has received multiple unicast request messages and/or multicast join messages for the same source/group address pair, the multicast-enabled router 16 may replicate the received multicast packets, and readdress and deliver, encapsulate and deliver, or forward the replicated packets as indicated by the multicast forwarding information maintained by the multicast-enabled router 16.

Figure 3:
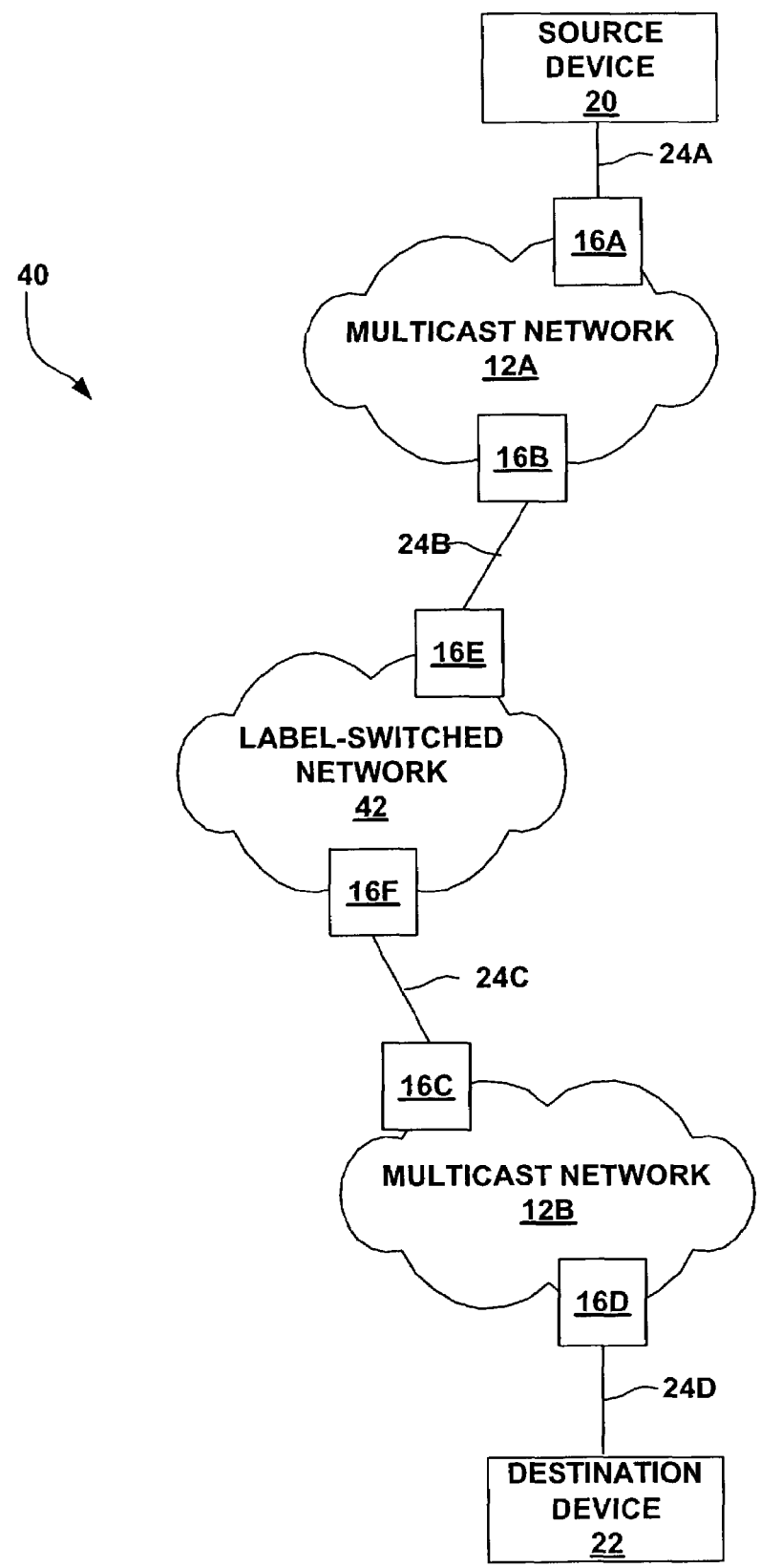
FIG. 3 is a block diagram illustrating another example computer network that supports delivery and reception of multicast content across a unicast network, which in this case is a label-switched network.

FIG. 3 is a block diagram illustrating another example computer network 40 that supports delivery and reception of multicast content across a unicast network, which in this case is a label-switched network 42. As shown in FIG. 3, computer network 40 includes multicast networks 12A and 12B and label-switched network 42. Multicast networks 12A and 12B (multicast networks 12) include multicast-enabled routers 16A and 16B, and multicast-enabled routers 16C and 16D (multicast-enabled routers 16) respectively. Label-switched network 42 includes multicast-enabled routers 16E and 16F (multicast-enabled routers 16), and a number of label-switched routers (not shown) that are not multicast-enabled. Multicast networks 12 and label-switched network 42 may include any number of multicast-enabled routers 16. However, for ease of illustration, only multicast-enabled routers 16A-F are shown in FIG. 3.

A source device 20, accesses multicast network 12A via a link 24A and multicast-enabled router 16A. At the boundary between multicast network 12A and label-switched network 42, multicast-enabled router 16B and multicast-enabled router 16E are connected via a link 24B. At the boundary between label-switched network 42 and multicast network 12B, multicast-enabled router 16F and multicast-enabled router 16C are connected by a link 24C. A destination device 22 accesses multicast network 12B via a link 24D and multicast-enabled router 16D.

Source device 20 is, as described above with reference to FIGS. 1 and 2, a source of content delivered as multicast packets. Destination device 22 is, as described above with reference to FIGS. 1 and 2, a host within computer network 40 that wishes to receive the content that is delivered by source device 20 as multicast packets. As described above with reference to FIGS. 1 and 2, links 24 may be, for example, PPP links, ATM links, Ethernet links, Frame Relay link, GRE tunnels, SONET links, or other network connections.

As described above with reference to FIGS. 1 and 2, multicast-enabled routers 16 support multicasting protocols, such as IGMP and PIM, that allow a single multicast packet generated by a source device to be delivered to multiple destination devices through replication and forwarding of the multicast packet along a distribution tree between the source device and destination devices. As described above with reference to FIGS. 1 and 2, multicast-enabled router 16E supports delivery of multicast content across label-switched network 42 in that multicast-enabled router 16E is able to intercept unicast request messages that are sent by requesting devices and include as a destination address an address associated with source devices 20, and deliver the multicast packets to the requesting devices as unicast packets. Additionally, as described above with reference to FIG. 2, multicast-enabled router 16F supports reception of multicast content across label-switched network 42 in that multicast-enabled router 16F is able to determine whether the route to source device 20 is multicast-enabled, send a unicast request message that includes as a destination address an address associated with source device 20 and is marked for interception by an intermediate network device, and receive multicast packets as unicast packets from the intermediate network device across label-switched network 42 so that it the multicast packets may be delivered to a destination device 22. Further, multicast-enabled routers 16E and 16F support delivery and reception of multicast content across label-switched network 42 in that multicast-enabled routers 16E and 16F are able to deliver and receive multicast packets across label-switched network 42 via label-switched paths (LSPs).

Multicast-enabled router 16D may receive a multicast join message from destination device 22 indicating a source/group address pair where the source address is an address for source device 20, and multicast-enabled router 16C may receive a multicast join message from multicast-enabled router 16D indicating the source/group address pair, as described above with reference to FIG. 2. In this case, multicast-enabled router 16C will determine that multicast-enabled router 16F, the next-hop router on a route to source device 20, is multicast-enabled, and will send a multicast join message to multicast-enabled router 16F indicating the source/group address pair. When multicast-enabled router 16F receives the multicast join message from multicast-enabled router 16C, multicast-enabled router 16F will determine that a next-hop router on a route to source device 20, i.e., one of the label-switched routers within label-switched network 42, is not multicast-enabled. Multicast-enabled router 16F will send a unicast request message that includes as a destination address an address associated with device 20 and is marked for interception by an intermediate network device, such as another multicast-enabled router 16.

Multicast-enabled routers 16E and 16F of label-switched network 42, use one or more protocols, such as the Resource Reservation Protocol (RSVP) or Label Distribution Protocol (LDP), to establish label-switched paths (LSPs) between themselves. Multicast-enabled routers 16E and 16F send packets across label-switched network 42 via LSPs that include label-switched routers within label-switched network 42. Label-switched network 42 may be a Multiprotocol Label Switching (MPLS) network. Multicast-enabled routers 16E and 16F may establish LSPs for multicast traffic that are distinct from LSPs that have been established for unicast traffic, advantageously allowing separate traffic engineering of the multicast traffic Multicast-enabled routers 16E and 16F use routing protocols such as the Border Gateway Protocol (BGP) to exchange unicast routing information that describes routes to various destinations within computer network 40. When multicast-enabled routers 16E and 16F advertise routes to each other the advertising multicast-enabled router 16E or 16F may advertise a label with the route. The advertised label indicates the LSP by which packets addressed to the advertised destination should be sent, and is the label that should be added on the packets addressed to the destination by the other multicast-enabled router 16E or 16F. Multicast-enabled routers 16E and 16F may maintain this label and LSP information as unicast routing information associated with the destination.

When multicast-enabled router 16F sends the unicast request message addressed to source device 20, multicast-enabled router 16F will refer to the unicast routing information maintained by multicast-enabled router 16F. The unicast routing information maintained by multicast-enabled router 16F will include a route to source 20 that traverses label-switched network 42 advertised by multicast-enabled router 16E. Multicast-enabled router 16F will add the label advertised by multicast-enabled router 16E with the route to the one or more packets of the unicast request message, select an LSP to multicast-enabled router 16E based on the label, and deliver the packets on the selected LSP.

Thus, multicast-enabled router 16F may send the unicast request message directly to multicast-enabled router 16E via the indicated LSP using the indicated label. Because the unicast request message is sent directly to multicast-enabled router 16E via the indicated LSP, the one or more packets of the unicast request message need not include a set router alert bit to cause multicast-enabled router 16E to intercept the unicast request message, and the unicast request message need not be captured and examined at each label-switched router within label-switched network 42 on the LSP between multicast-enabled routers 16F and 16E. Multicast-enabled router 16F sending the unicast request message directly to multicast-enabled router 16E in this manner may advantageously reduce consumption of the bandwidth and processing resources of the label-switched routers, shorten the time required for the unicast request message to reach multicast-enabled router 16E.

The unicast request message sent by multicast-enabled router 16F contains the group address indicated in the multicast join message received from multicast-enabled router 16C, the address of source device 20, which may be the destination address of the one or more packets of the unicast request message, and the address of the requesting device, i.e., the address of multicast-enabled router 16D. The unicast request message may also contain a delivery mode indication. The delivery mode indicated may be label-switched delivery, indicating to multicast-enabled router 16E that a label should be added to multicast packets received with the indicated source/group address pair, and the labeled packets should be forwarded on an LSP to multicast-enabled router 16F. The unicast request message may also contain a time-out value as described above. Further, as described above, the one or more packets of the unicast request message sent by multicast-enabled router 16F may contain information that will cause multicast-enabled router 16E to identify the unicast request message as containing a request to receive multicast packets as unicast packets, such as a port indication.

When multicast-enabled router 16E receives the unicast request message sent by multicast-enabled router 16F, multicast-enabled router 16E may store information from the message as multicast forwarding information for the source/group address pair indicated by the unicast request message, and determine whether multicast-enabled router 16E is already receiving multicast packets for the source/group address, as described above. The information stored by multicast-enabled router 16E includes the address of multicast-enabled router 16F, and may include a delivery mode indication and a time-out value. If multicast-enabled router 16E is not already receiving multicast packets, multicast-enabled router 16E may send a multicast join message, such as a PIM Join, to source device 20 as described above.

When multicast-enabled router 16E receives multicast packets for the source/group address pair, multicast-enabled router 16E will label the multicast packets and forward the labeled packets to multicast-enabled router 16F via an LSP based on the address of multicast-enabled router 16F indicated by the unicast request message. Multicast-enabled router 16E may recognize that the multicast packets should be labeled and delivered in this manner based on a delivery mode indication received in the unicast request message from multicast-enabled router 16F. Multicast-enabled router 16E may identify the label and LSP each time that multicast-enabled router 16E receives a multicast packet with the source/group address pair, or may identify the appropriate label and LSP a single time when the unicast request message is received and store the appropriate label and LSP with the information from the unicast request message, e.g., as multicast forwarding information. Multicast-enabled router 16F, as was the case with destination devices 22 of FIG. 1 and multicast-enabled router 16C of FIG. 2, may need to periodically resend the unicast request message, i.e., before the time-out period indicated by the unicast request message expires, in order to continue to receive the labeled packets.

When multicast-enabled router 16F receives the labeled packets via the identified LSP from multicast-enabled router 16E, multicast-enabled router 16F will remove the labels to expose the multicast packets. Multicast-enabled routers 16F, 16C and 16D will forward the multicast packets according to the multicast forwarding information that they maintain, as described above, until the packets are received by destination device 22. As described above, if one of the multicast-enabled routers 16 has received multiple unicast request messages and/or multicast join messages for the same source/group address pair, the multicast-enabled router 16 may replicate the received multicast packets, and readdress and deliver, encapsulate and deliver, or forward the replicated packets as indicated by the multicast forwarding information maintained by the multicast-enabled router 16.

The ability of multicast-enabled routers 16 to deliver and receive multicast content across label-switched networks advantageously reduces the costs that are born by the content provider in delivering content to destination devices that would otherwise be unable to receive multicast packets, as described above. Moreover, the ability of multicast-enabled routers 16 to deliver and receive multicast content across label-switched networks may provide additional advantages, such as allowing the delivery of multicast content in a virtual private network (VPN) utilizing a label-switched network of a provider of the VPN service. For example, referring to FIG. 3, multicast networks 12 may be geographically distributed site networks of a single enterprise, which form a VPN via label-switched network 42. A provider of the VPN service to the enterprise may provide access to label-switched network 42 via multicast-enabled routers 16E and 16F that are maintained by the VPN service provider. Destination device 22 at one enterprise site may be able to receive multicast packets from source device 20 at a different enterprise site that may be geographically remote from destination device 22. Further, the delivery of the multicast packets within the VPN via label-switched network 42 may be more secure than delivery via a packet-switched network.

Figure 4:
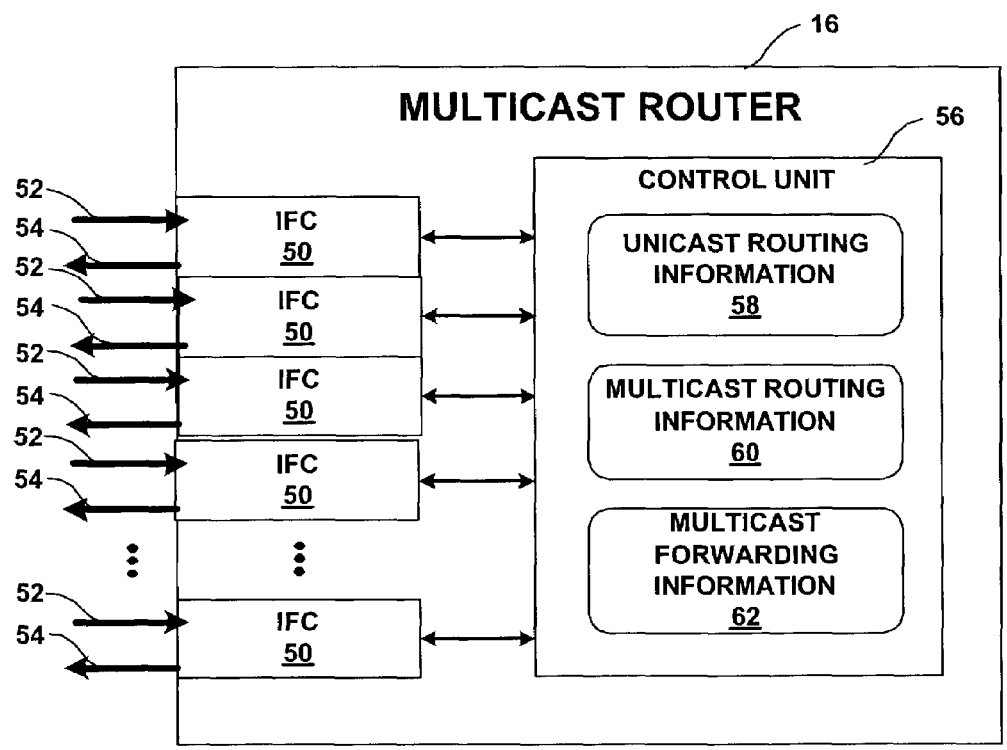
FIG. 4 is a block diagram illustrating an example multicast-enabled router that can deliver and receive multicast content across unicast networks consistent with the principles of the invention.

FIG. 4 is a block diagram illustrating an exemplary multicast-enabled router 16 that that can deliver and receive multicast content across a unicast network 14, which may be a label-switched network 42, consistent with the principles of the invention. Multicast-enabled router 16 includes one or more interface cards (IFCs) 50 coupled to network links 52 and 54. IFCs 50 are typically coupled to network links 52, 54 via a number of interface ports. Multicast-enabled router 16 also includes a control unit 56. Control unit 56 receives and sends multicast packets, unicast packets, multicast join messages, and unicast join messages in the manner attributed to multicast-enabled routers 16 above, via IFCs 50 and network links 52 and 54, respectively.

As shown in FIG. 4, control unit 56 may maintain unicast routing information 58, multicast routing information 60, and multicast forwarding information 62, in the manner attributed to multicast-enabled routers 16 above. Control unit 56 may maintain unicast routing information 58, multicast routing information 60, and multicast forwarding information 62 within a memory within control unit 56, or a memory otherwise accessible to control unit 56. Control unit 56 may execute program instructions stored on a variety of magnetic or optical media, such as hard disk, magnetic disk, CD-ROM, RAM, ROM, EEPROM, flash memory, or the like, or received via a computer network, such as computer networks 10, 20 and 30 of FIGS. 1, 2 and 3, respectively.

Figure 5:
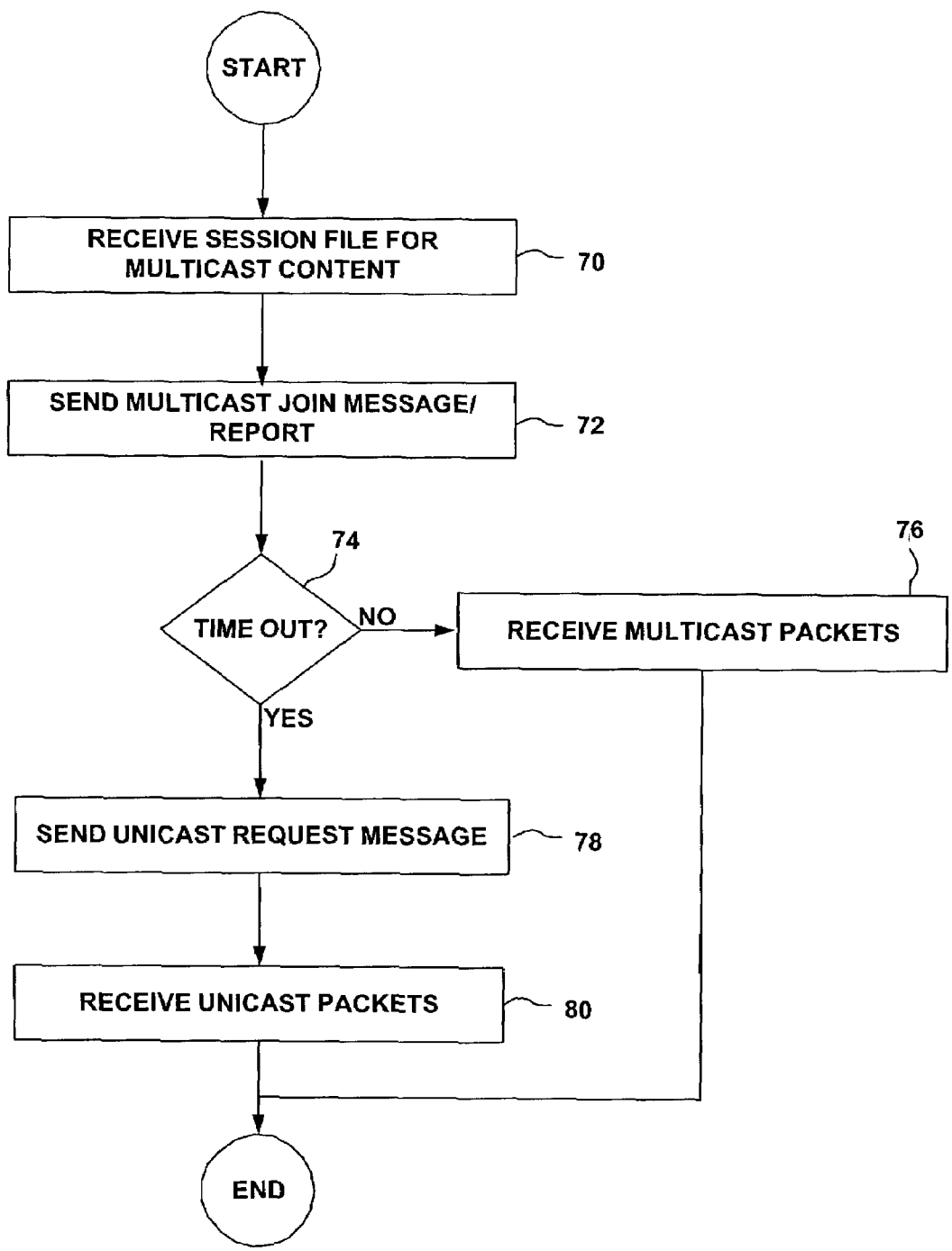
FIG. 5 is a flow diagram illustrating an example method that may be employed by a destination device to receive multicast content across a unicast network.

FIG. 5 is a flow diagram illustrating an example method that may be employed by a destination device 22 to receive multicast content across a unicast network 14. When the destination device 22 receives a session file for the multicast content (70), the destination device 22 will send a multicast join message to a local router (72). The destination device 22 receives the information necessary to send the multicast join message, such as the group address and the address for the source device 20, in the session description file. A session description file may be sent to the requesting destination device 22 by the source device 20, or another device within a computer network 10,20,30. The multicast join message sent by the destination device 22 may take the form of an IGMP control packet, e.g., a Host Membership Report, that indicates the source/group address pair.

The destination device 22 may begin to run a timer when it sends the multicast join message (74). The timer will run until multicast packets for the requested content arrive (76), or the timer reaches a predetermined value or reaches zero from the predetermined value. If the time out condition is satisfied, the destination device 22 may attempt to resend the multicast join message. When the original, and any additional attempts to join the multicasting group fail, i.e., when the destination device 22 determines that the route to the source device 20 is not multicast-enabled, the destination device 22 will send a unicast request message that includes as a destination address an address associated with the source device 20 and marked for interception by an intermediate network device, such as a multicast-enabled router 16 (78).

As described above, the unicast request message contains information that will be used by a multicast-enabled router 16 to receive the multicast packets containing the multicast content, and deliver the multicast packets to the destination device 22 as unicast packets. The information includes the group address associated with the multicast content, the address of the source device 20, which may be the destination address of the one or more packets of the unicast request message, and the address of destination device 22, which is the source address of the one or more packets of the unicast request message. The information may also include a delivery mode indication and a time-out value, as described above. The delivery mode indicated in a unicast request message sent by the destination device 22 may be readdressed delivery, indicating that multicast packets received with the source/group address pair indicated by the unicast request message should be readdressed to include the address of the destination device 22, and forwarded accordingly, or encapsulated delivery, indicating that the multicast packets received should be encapsulated with a header that includes the address of the destination device. The one or more packets of the unicast request message may also contain information that will cause a multicast-enabled router 16, which is on the route to the source device 20, to intercept and process the packets of the unicast request message, such as a set router alert bit, and identify the unicast request message as containing a request to receive multicast packets as unicast packets, such as a port indication, or may be addressed to an anycast address. After the unicast request message is intercepted and processed by a multicast-enabled router 16 as described above, the destination device 22 will receive unicast packets containing the requested multicast content (80). As described above, the destination device 22 may need to periodically resend the unicast request message in order to continue to receive the unicast packets.

Figure 6:
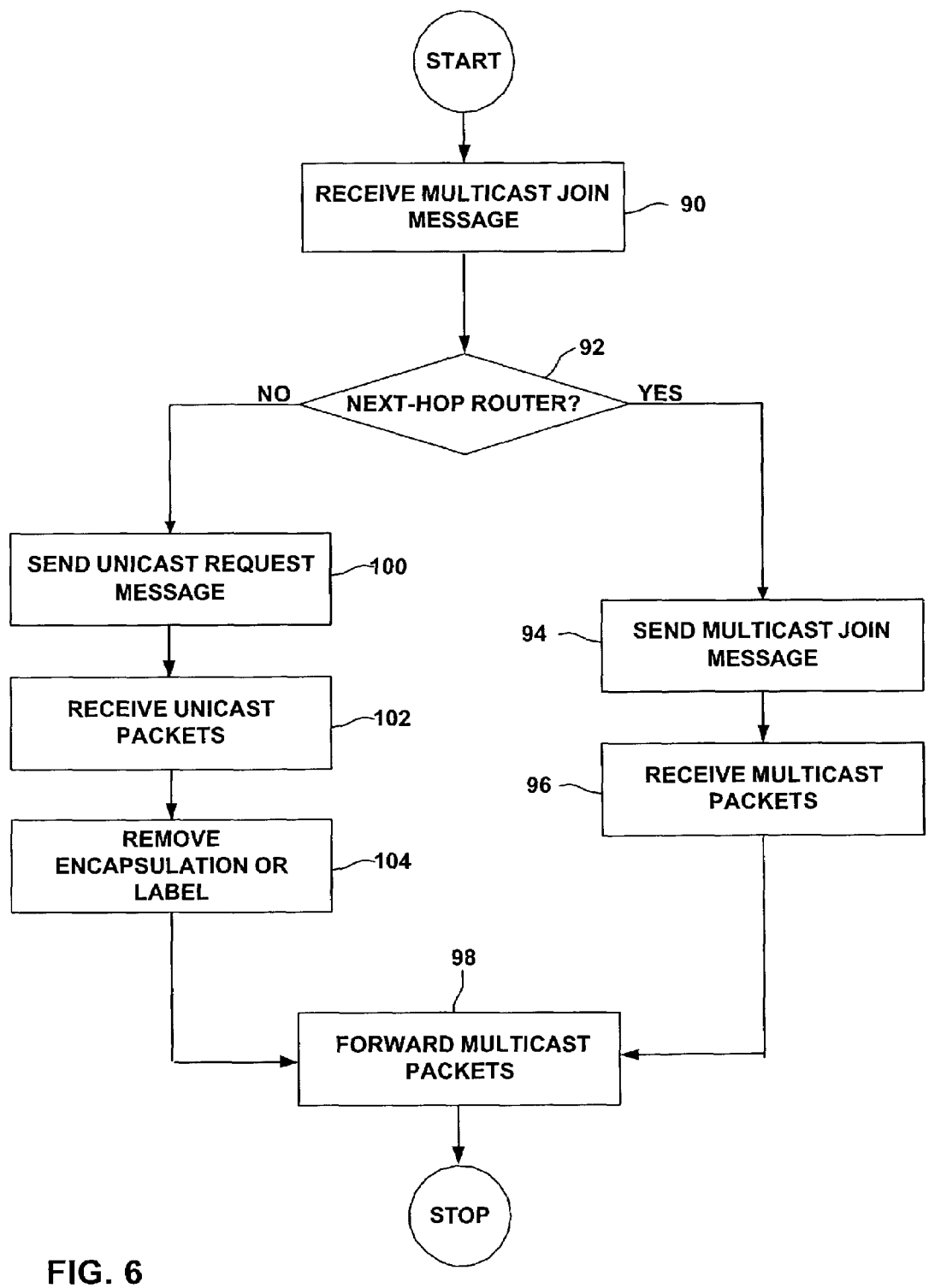
FIG. 6 is a flow diagram illustrating an example method that may be employed by a multicast-enabled router to receive multicast content across a unicast network, so that it may be delivered to a destination device.

FIG. 6 is a flow diagram illustrating an example method that may be employed by a multicast-enabled router 16 to receive multicast content across a unicast network 14 so that it may be delivered to a destination device 22. The unicast network 14 may be a label-switched network 42. When the multicast-enabled router 16 receives a multicast join message (90), such as a IGMP host membership report from a destination device 22 or a PIM Join from another multicast-enabled router 16, the multicast-enabled router 16 will identify the source/group address pair indicated by the multicast join message, identify the interface by which the multicast join message was received, and associate the interface with the source/group address pair within the multicast forwarding information maintained by the multicast-enabled router 16. The multicast-enabled router 16 will also determine whether a route to the source device 20 indicated by the source/group address pair of the received multicast join message is multicast-enabled by determining whether a next-hop router on a route to a source device 20 is multicast-enabled (92), as described above.

If the next-hop router is multicast-enabled, the multicast-enabled router 16 will send a multicast join message (94), such as a PIM Join, toward the source device by sending the multicast join message to the next-hop multicast-enabled router 16 via another interface. Eventually, in response to the sent multicast join message, the multicast-enabled router 16 will receive multicast packets for the source/group address pair from the next-hop multicast-enabled router 16 via the second interface (96), and forward the multicast packets via the first interface, i.e., according to the multicast forwarding information maintained by the multicast-enabled router 16 (98).

If the next-hop router is not multicast-enabled, e.g., a unicast router 18 or a label-switched router, the multicast-enabled router 16 will send a unicast request message that includes as a destination address an address associated with the source device 20 indicated by the source/group address pair of the received multicast join message, or to an anycast address (100). If the next-hop router is a unicast router 14, the multicast-enabled router 16 may send the unicast request message via a unicast route to the source device 20 or anycast address within unicast routing information maintained by the multicast-enabled router 16, as described above. If the next-hop router is a label-switched router, the unicast route to the source device 20 within unicast routing information maintained by the multicast-enabled router 16 may also indicate a label to add to the one or more packets of the unicast request message, and an LSP on which to send the unicast request message, as described above.

The unicast request message sent by the multicast-enabled router 16 contains the group address and the address of source device 20 which are indicated in the received multicast join message, and the address of the multicast-enabled router 16. The address of the multicast-enabled router 16 will be the source address, and the address of the source device 20 or an anycast address will be the destination address of the one or more packets of the unicast request message. The unicast request message may also contain a delivery mode indication and time-out value as described above. The delivery mode indicated may be encapsulated or label-switched encapsulation, as described above. Further, as described above, the one or more packets of the unicast request message sent the by multicast-enabled router 16 may contain information that will cause another multicast-enabled router 16 on the route to the source device 20 to intercept and process the packets of the unicast request message, such as a set router alert bit, and identify the unicast request message as containing a request to receive multicast packets as unicast packets, such as a port indication.

Eventually, the multicast-enabled router 16 that sent the unicast request message will receive unicast packets from the multicast-enabled router 16 that intercepts the unicast request message (102). The unicast packets may be multicast packets for the source/group address pair indicated by the unicast request message encapsulated or labeled according to the delivery mode indication. The unicast packets may include a header that includes the address of the multicast-enabled router 16 that sent the unicast request message as a destination address if, for example, the delivery mode indication indicated encapsulated delivery. The unicast packets may include a label and be sent by an LSP if, for example, delivery mode indication indicated label-switched delivery. The multicast-enabled router 16 that sent the unicast request message and receives the unicast packets may remove the encapsulation or labels to expose the multicast packets for the source/group address pair indicated in the unicast request message (104), replicate the multicast packets if more than one interface is indicated in multicast forwarding information maintained by the multicast-enabled router for the source/group address pair, and forward the multicast packets via the indicated interfaces (106).

Figure 7:
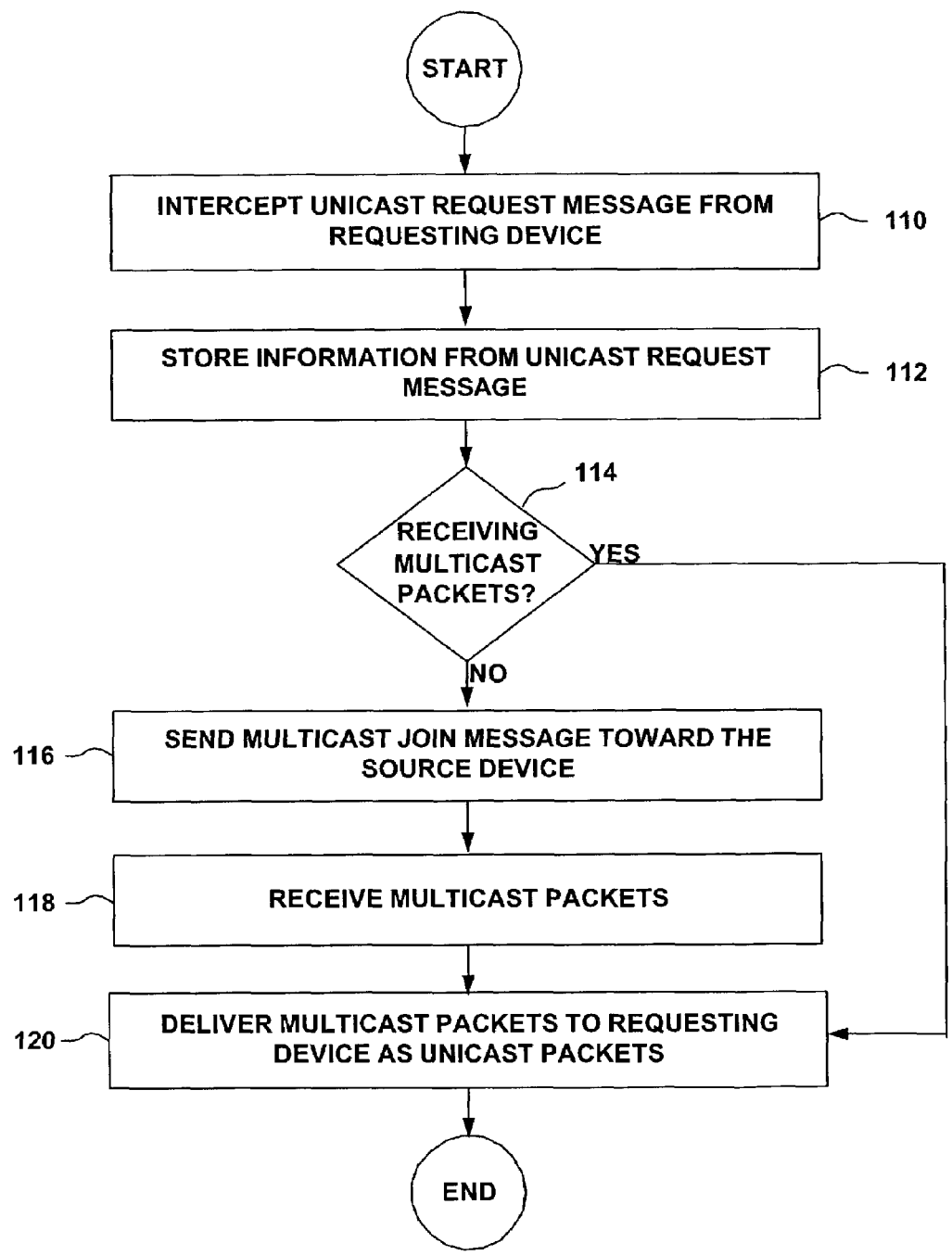
FIG. 7 is a flow diagram illustrating an example method that may be employed by multicast-enabled router to deliver multicast content to a requesting device across a unicast network.

FIG. 7 is a flow diagram illustrating an example method that may be employed by a multicast-enabled router 16 to deliver multicast content to a requesting device across a unicast network 14. The unicast network 14 may be a label-switched network 42. The requesting device may be a destination device 22 or another multicast-enabled router 16.

When the multicast-enabled router 16 intercepts a unicast request message from the requesting device that includes as a destination address an address associated with a source device 20 (110), the multicast-enabled router 16 will store at least some of the information from the unicast request message (112). As described above, the one or more packets of the unicast request message may contain information that will cause the multicast-enabled router 16 to intercept and process the packets of the unicast request message, such as a set router alert bit, and identify the unicast request message as containing a request to receive multicast packets as unicast packets, such as a port indication. The information includes the group address associated with the multicast content, the address of the source device 20, which may be the destination address of the one or more packets of the unicast request message, and the address of destination device 22, which is the source address of the one or more packets of the unicast request message. The information may also include delivery mode indication and a time-out value, as described above. The delivery mode indication may indicate multicast packets received with the source/group address pair indicated by the unicast request message should be readdressed to include the address of the destination device 22 and forwarded accordingly, encapsulated with a header that includes the address of the requesting device and forwarded accordingly, or labeled and sent to the requesting device via an LSP. The multicast-enabled router 16 may store the information from the unicast request message as multicast forwarding information for the source/group address pair indicated by the unicast request message.

The multicast-enabled router 16 determines whether it is currently receiving multicast packets for the source/group address pair indicated by the unicast request message (114)

by, for example, determining whether there are any entries for the source/group address pair within the multicast forwarding information maintained by multicast-enabled router 16. If the multicast-enabled router 16 is not currently receiving multicast packets for the source/group address pair indicated by the unicast request message, the multicast-enabled router 16 will send a multicast join message toward the source device 20 (116) via a next-hop multicast-enabled router 16, as described above. The join message may indicate the source/group address pair, and may be a PIM Join. As described above, the multicast join message will travel hop-by-hop toward the source device 20 until it reaches the source device 20 or another multicast-enabled router 16 that is already receiving multicast packets for the source/group address pair. The multicast-enabled router 16 will, in response to the multicast join message, receive multicast packets for the source/group address pair (118).

As described above, when the multicast-enabled router 16 receives multicast packets for the source/group address pair indicated by the unicast request message, the multicast-enabled router 16 will deliver the multicast packets to the requesting device as unicast packets (120). The multicast-enabled router 16 may refer to a delivery mode indication received in the unicast request message and stored in multicast forwarding information maintained by the multicast-enabled router 16 for the source/group address pair, and deliver the multicast packets to the requesting device as unicast packets according to the delivery mode indicated. The multicast-enabled router 16 may readdress the multicast packets to include the address of the requesting device as the destination address of the packets, and deliver the readdressed packets on a route to the requesting device within the unicast routing information maintained by the multicast-enabled router 16. The multicast-enabled router 16 may add a header that includes the address of the requesting device as a destination address, and deliver the encapsulated packets on a route to the requesting device within the unicast routing information maintained by the multicast-enabled router 16. The multicast-enabled router 16 may add a label to the multicast packets, and send the labeled packets to the requesting device via an LSP. The label and LSP may be selected based on the address of the requesting device and unicast routing information maintained by the multicast-enabled router 16.

Various embodiments of the invention have been described. These and other embodiments are within the scope of the following claims.

The invention claimed is:

1. A method comprising:
    receiving a unicast request message sent from a requesting device to a source of multicast packets with a network device that is intermediate to the requesting device and the source of multicast packets, wherein the unicast request message includes as a destination address an address associated with the source of multicast packets;
    determining whether a router alert bit of at least one packet of the unicast request message is set, wherein the router alert bit provides an indication that a device different from the source of the multicast packets is to intercept the unicast request message addressed to the source device;
    intercepting and inspecting the unicast request message with an intermediate device when the router alert bit is set;
    determining that the unicast request message includes an indication that indicates that the requesting device requests delivery of multicast packets as unicast packets; and
    delivering, with the intermediate device, multicast packets received from the source of multicast packets to the requesting device as unicast packets based on the determination that the unicast request message includes the indication;
    wherein the intermediate device is unknown to the requesting device at a time when the router alert bit is set.

2. The method of claim 1, wherein the requesting device comprises one of a destination device and a multicast-enabled router.

3. The method of claim 1, wherein delivering the multicast packets comprises:
    sending a multicast join message to the source in response to the unicast request message;
    receiving the multicast packets in response to the multicast join message;
    generating the unicast packets from the multicast packets; and
    forwarding the unicast packets to the requesting device.

4. The method of claim 1, wherein the unicast request message includes an indication of a delivery mode for delivery of the multicast packets as unicast packets, the delivery mode selected from the group consisting of readdressed delivery, encapsulated delivery, and label-switched delivery, and delivering the multicast packets to the requesting device as unicast packets comprises delivering the unicast packets according to the indicated delivery mode.

5. The method of claim 1, wherein the multicast packets specify a multicast group address as a destination address, and delivering the multicast packets further comprises:
    identifying an address of the requesting device within the unicast request message; and
    readdressing the multicast packets to include the identified address as the destination address of the unicast packets.

6. The method of claim 1, wherein delivering the multicast packets further comprises:
    identifying an address of the requesting device within the unicast request message; and
    adding an encapsulation header that includes the identified address as a destination address to the multicast packets.

7. The method of claim 1, wherein delivering the multicast packets further comprises:
    identifying an address of the requesting device within the unicast request message;
    adding a label to the multicast packets based on the identified address; and
    delivering the labeled packets on a label-switched path based on the identified address.

8. The method of claim 1, wherein delivering the multicast packets further comprises:
    storing information from the unicast request message as multicast forwarding information; and
    delivering the multicast packets based on the multicast forwarding information.

9. The method of claim 8, wherein the information includes a source address, a group address, an address of the requesting device, a delivery mode indication, and a time-out value.

10. The method of claim 1, wherein the indication that indicates that the requesting device requests delivery of multicast packets as unicast packets comprises a port indication within a packet of the unicast request message.

11. The method of claim 1, wherein intercepting a unicast request message comprises intercepting a unicast request message that is addressed to the source of multicast packets.

12. The method of claim 1, wherein intercepting a unicast request message comprises intercepting a unicast request message that is addressed to an anycast address.

13. The method of claim 1, further comprising establishing a first label-switched path for multicast traffic and a second label-switched path for unicast traffic.

14. A network device that is intermediate to a requesting device and a source of multicast packets, the network device comprising:
  an interface to receive a unicast request message sent from the requesting device to the source of multicast packets, wherein the unicast request message includes as a destination address an address associated with the source of multicast packets; and
  a control unit to determine whether a router alert bit of at least one packet of the unicast request message is set, wherein the router alert bit provides an indication that a device different from the source of the multicast packets is to intercept the unicast request message addressed to the source device, intercept and inspect the unicast request message when the router alert bit is set, determine whether the unicast request message includes an indication that indicates that the requesting device requests delivery of multicast packets as unicast packets, and deliver multicast packets received from the source of multicast packets to the requesting device as unicast packets when the unicast request message includes the indication;
  wherein the network device is unknown to the requesting device when the router alert bit is set.

15. The network device of claim 14, wherein the requesting device comprises one of a destination device and a multicast-enabled router.

16. The network device of claim 14, wherein the control unit further sends a multicast join message to the source in response to the unicast request message to receive the multicast packets, generates the unicast packets from the multicast packets, and forwards the unicast packets to the requesting device.

17. The network device of claim 14,
  wherein the unicast request message includes an indication of a delivery mode for delivery of the multicast packets as unicast packets, the delivery mode selected from the group consisting of readdressed delivery, encapsulated delivery, and label-switched delivery, and
  wherein the control unit delivers the unicast packets according to the indicated delivery mode.

18. The network device of claim 14, wherein the multicast packets specify a multicast group address as a destination address, and the control unit identifies an address of the requesting device within the unicast request message and readdresses the multicast packets to include the identified address as the destination address of the packets.

19. The network device of claim 14, wherein the control unit delivers the multicast packets to the requesting device as unicast packets by identifying an address of the requesting device within the unicast request message, and adding an encapsulation header that includes the identified address as a destination address to the multicast packets.

20. The network device of claim 14, wherein the control unit delivers the multicast packets to the requesting device as unicast packets by identifying an address of the requesting device within the unicast request message, adding a label to the multicast packets based on the identified address, and delivering the labeled packets on a label-switched path based on the identified address.

21. The network device of claim 14, further comprising a memory,
  wherein the unicast request message contains information,
  wherein the control unit stores at least some of the information as multicast forwarding information, and
  wherein the control unit delivers the multicast packets based on the multicast forwarding information.

22. The network device of claim 21, wherein the information includes a source address, a group address, an address of the requesting device, a delivery mode indication, and a time-out value.

23. The network device of claim 14, wherein the indication that indicates that the requesting device requests delivery of multicast packets as unicast packets comprises a port indication within the message.

24. The network device of claim 14, wherein the control unit intercepts a unicast request message by intercepting a unicast request message that is addressed to the source of multicast packets.

25. The network device of claim 14, wherein the control unit intercepts a unicast request message by intercepting a unicast request message that is addressed to an anycast address.

26. The network device of claim 14, wherein the control unit establishes a first label-switched path for multicast traffic and a second label-switched path for unicast traffic.

27. A computer-readable storage medium comprising instructions that cause a processor to:
  intercept a unicast request message sent from a requesting device to a source of multicast packets at a network device that is intermediate to the requesting device and the source of multicast packets, wherein the unicast request message includes as a destination address an address associated with the source of multicast packets;
  determine that a router alert bit of at least one packet of the unicast request message is set, wherein the router alert bit provides an indication that a device different from the source of the multicast packets is to intercept the unicast request message that is addressed to the source device;
  intercept and inspect the unicast request message with an intermediate device based on the determination that the router alert bit is set;
  determine at the intermediate device that the unicast request message includes an indication that the requesting device requests delivery of multicast packets as unicast packets; and
  deliver multicast packets received at the intermediate device from the source of multicast packets to the requesting device as unicast packets from the intermediate device based on the determination that the unicast request message includes the indication.

28. The computer-readable storage medium of claim 27, wherein the instructions that cause the processor to delivery the multicast packets as unicast packets comprise instructions that cause the processor to:
  send a multicast join message to the source in response to the unicast request message;
  receive the multicast packets in response to the multicast join message;
  generate the unicast packets from the multicast packets; and forward the unicast packets to the requesting device.

29. The computer-readable storage medium of claim 27, wherein the unicast request message includes an indication of a delivery mode for delivery of the multicast packets as unicast packets, the delivery mode selected from the group consisting of readdressed delivery, encapsulated delivery, and label-switched delivery, and wherein the instructions that cause the processor to deliver the multicast packets to the requesting device as unicast packets comprise instructions that cause the processor to deliver the unicast packets according to the indicated delivery mode.

30. The computer-readable storage medium of claim 27, wherein the multicast packets specify a multicast group address as a destination address, and the instructions that cause the processor to deliver the multicast packets to the requesting device as unicast packets comprise instructions that cause the processor to identify an address of the requesting device within the unicast request message and readdress the multicast packets to include the identified address as the destination address of the unicast packets.

31. The computer-readable storage medium of claim 27, wherein the instructions that cause the processor to deliver the multicast packets to the requesting device as unicast packets comprise instructions that cause the processor to identify an address of the requesting device within the unicast message, and add an encapsulation header that includes the identified address as a destination address to the multicast packets.

32. The computer-readable storage medium of claim 27, wherein the instructions that cause the processor to deliver the multicast packets to the requesting device as unicast packets comprises instructions that cause the processor to identify an address of the requesting device within the unicast message, add a label to the multicast packets based on the identified address, and deliver the labeled packets on a label-switched path based on the identified address.

33. The computer-readable storage medium of claim 27, wherein the unicast request message contains information, and the instructions that cause the processor to deliver the multicast packets to the requesting device as unicast packets comprise instructions that cause the processor to store at least some of the information as multicast forwarding information and deliver the multicast packets based on the multicast forwarding information.

34. A method comprising:
    determining whether a route from a requesting device to a source of multicast packets is multicast-enabled; and
    sending a unicast request message from the requesting device to the source of multicast packets based on the determination, wherein the unicast request message includes as a destination address an address associated with the source, and further wherein sending the unicast request message comprises:
    setting a router alert bit in at least one packet of the unicast request message to cause a network device that is intermediate to the requesting device and the source of multicast packets to intercept and inspect the unicast request message addressed to the source, and
    including an indication within the unicast request message that indicates to the intermediate network device that the requesting device requests delivery of multicast packets as unicast packets, and
    wherein the method further comprises, at the requesting device, receiving multicast packets from the source as unicast packets from the intermediate network device;

wherein the network device is unknown to the requesting device when the router alert bit is set.

35. The method of claim 34, wherein determining whether a route to a source of multicast packets is multicast-enabled further comprises:
    sending a multicast join message from the requesting device requesting the multicast packets; and
    determining that the multicast packets have not been received at the requesting device in response to the multicast join message before a time-out condition has been satisfied, and
    wherein sending a unicast request message comprises sending the request message in response to the determination that the multicast packets have not been received before the time-out condition has been satisfied.

36. The method of claim 34, further comprising receiving a multicast join message that requests the multicast packets,
    wherein determining whether a route to a source of the multicast packets is multicast-enabled comprises determining whether a next-hop network device on the route to the source is multicast-enabled.

37. The method of claim 36, wherein determining whether a next-hop device is multicast-enabled comprises determining whether the next-hop network device is a peer for a multicast protocol.

38. The method of claim 36, wherein receiving the multicast packets comprises receiving the multicast packets as encapsulated packets, the method further comprising:
    identifying an interface by which the multicast join message was received;
    removing the encapsulation to expose the multicast packets; and
    forwarding the multicast packets on the identified interface.

39. The method of claim 36, wherein receiving the multicast packets comprises receiving labeled packets via a label switched path, the method further comprising:
    identifying an interface by which the multicast join message was received;
    removing the labels to expose multicast packets; and
    forwarding the multicast packets on the identified interface.

40. The method of claim 36, wherein the unicast request message includes a source address, a group address, an address of a device that sends the message, a delivery type indication and a time-out value.

41. The method of claim 34, wherein the unicast request message is addressed to the source.

42. The method of claim 34, wherein the unicast request message is addressed to an anycast address.

43. The method of claim 34, further comprising establishing a first label-switched path for multicast traffic and a second label-switched path for unicast traffic.

44. A requesting device comprising a control unit to:
    determine whether a route between the requesting device and a source of multicast packets is multicast-enabled,
    send a unicast request message to the source of multicast packets based on the determination, wherein the unicast request message includes as a destination address an address associated with the source of multicast packets,
    set a router alert bit in at least one packet of the unicast request message to cause a network device that is intermediate to the device and the source of multicast packets to intercept and inspect the unicast request message addressed to the source, include an indication within the unicast request message that indicates to the intermediate network device that the requesting device requests delivery of multicast packets as unicast packets, and receive multicast packets from the source as unicast packets from the intermediate network device;

wherein the intermediate network device is unknown to the control unit when the router alert bit is set.

45. The device of claim 44, wherein the control unit determines that the route to the source of multicast packets is not multicast-enabled by sending a multicast join message requesting the multicast packets and determining that the multicast packets have not been received in response to the join message before a time-out condition has been satisfied, and wherein the control unit sends the unicast request message in response to determining that the multicast packets have not been received before the time-out condition has been satisfied.

46. The device of claim 44, further comprising an interface to receive a multicast join message, wherein the control unit determines whether the route to the source of multicast packets is multicast-enabled by determining whether a next-hop network device on the route to the source is multicast-enabled.

47. The device of claim 44, wherein the control unit determines whether the next-hop network device is multicast-enabled by determining whether the next-hop network device is a peer for a multicast protocol.

48. The device of claim 44, wherein the control unit receives the multicast packets as unicast packets by receiving encapsulated packets, identifies the interface by which the multicast join message was received, removes the encapsulation to expose the multicast packets, and forwards the multicast packets via the identified interface.

49. The device of claim 44, wherein the control unit receives the multicast packets as unicast packets by receiving labeled packets via a label-switched path, identifies an interface by which the multicast join message was received, removes the labels to expose the multicast packets, and forwards the multicast packets via the identified interface.

50. A computer-readable storage medium comprising instructions that cause a processor to:

determine whether a route between a requesting device and a source of multicast packets is multicast-enabled;

send a unicast request message from the requesting device to the source of multicast packets based on the determination, wherein the unicast request message is addressed to the source;

set a router alert bit in at least one packet of the unicast request message to cause a network device that is intermediate to the requesting device and the source of multicast packets to intercept and inspect the unicast request message addressed to the source, include an indication within the unicast request message that indicates to the intermediate network device that the requesting device requests delivery of multicast packets as unicast packets, and at the requesting device, receive multicast packets from the source as unicast packets from the intermediate network device;

wherein the intermediate second device is unknown to the first device when the router alert bit is set.

51. The computer-readable storage medium of claim 50, wherein the instructions that cause the processor to determine whether the route to the source of multicast packets is multicast-enabled comprise instructions that cause the processor to send a multicast join message requesting the multicast packets and determine that the multicast packets have not been received before a time-out condition has been satisfied, and wherein the instructions that cause the processor to send a unicast request message comprise instructions that cause the process to send the unicast request message in response to determining that the multicast packets have not been received before the time-out condition has been satisfied.

52. The computer-readable storage medium of claim 50, wherein the instructions that cause the processor to determine whether the route to the source of multicast packets is multicast-enabled comprise instructions that cause the processor to determine whether a next-hop device on the route to the source is multicast-enabled.

53. The computer-readable storage medium of claim 50, wherein the instructions that cause the processor to receive the multi cast packets comprise instructions that cause the processor to receive encapsulated packets, the medium further comprising instructions that cause the processor to:

receive a multicast join message;

identify an interface by which the multicast join message was received;

remove the encapsulation to expose multicast packets; and forward the multicast packets on the identified interface.

54. The computer-readable storage medium of claim 50, wherein the instructions that cause the processor to receive the multicast packets comprise instructions that cause the processor to receive labeled packets via a label-switched path, the medium further comprising instructions that cause the processor to:

receive a multicast join message;

identify an interface by which the multicast join message was received;

remove the labels to expose multicast packets; and forward the multicast packets on the identified interface.

55. A system comprising:

a first device to determine whether a route between the first device and a source of multicast packets is multicast-enabled, send a unicast request message that includes as a destination address an address associated with the source based on the determination, set a router alert bit in at least one packet of the unicast request message to cause a second device that is intermediate to the requesting device and the source of multicast packets to intercept and inspect the unicast request message, include an indication within the unicast request message that indicates to the intermediate second device that the first device requests delivery of multicast packets as unicast packets, and receive multicast packets from the source as unicast packets from the second device; and the intermediate second device, wherein the second device intercepts the unicast request message and delivers the multicast packets from the source to the first device as unicast packets in response to the unicast request message.

56. The system of claim 55, wherein the first device determines that the route to the source of multicast packets is not multicast-enabled by sending a multicast join message requesting the multicast packets and determining that the multicast packets have not been received before a time-out condition has been satisfied, and wherein the first device sends the unicast request message in response to determining that the multicast packets have not been received before the time-out condition has been satisfied.

57. The system of claim 55, wherein the first device determines whether the route to the source of multicast packets is multicast-enabled by determining whether a next-hop network device on the route to the source is multicast-enabled.

58. The system of claim 55, wherein the unicast request message indicates a delivery mode, and wherein the second device delivers the multicast packets to the first device as unicast packets according to the indicated delivery mode.

59. The system of claim 55, wherein the multicast packets specify a multicast group address as a destination address, and the second device delivers the multicast packets to the first device as unicast packets by identifying an address of the first device within the unicast request message and readdressing the multicast packets to include the identified address as the destination address of the packets.

60. The system of claim 55, wherein the second device delivers the multicast packets to the first device as unicast packets by identifying an address of the first device within the unicast request message and adding an encapsulation header that includes the identified address as a destination address to the multicast packets.

61. The system of claim 55, the second device delivers the multicast packets to the first device as unicast packets by identifying an address of the first device within the unicast request message, adding a label to the multicast packets based on the identified address, and delivering the labeled packets on a label-switched path based on the identified address.

* * * * *